United States Patent [19]
Harry, III

[11] Patent Number: 5,597,477
[45] Date of Patent: Jan. 28, 1997

[54] SEWAGE EFFLUENT DISPOSAL SYSTEM HAVING SPARGER IN HOLDING TANK

[76] Inventor: David W. Harry, III, 7385 Red Bud La., Olive Branch, Mich. 38654

[21] Appl. No.: 439,118

[22] Filed: May 11, 1995

[51] Int. Cl.$^6$ .................................................. B01D 17/12
[52] U.S. Cl. ........................... 210/86; 210/121; 210/138; 210/170; 210/257.1; 210/258; 210/532.2
[58] Field of Search ............................... 210/86, 104, 108, 210/121, 138, 170, 192, 195.1, 196, 202, 205, 206, 257.1, 258, 259, 333.01, 340, 411, 416.1, 519, 532.1, 532.2; 417/360, 361

[56] References Cited

U.S. PATENT DOCUMENTS

| | | | |
|---|---|---|---|
| 3,933,641 | 1/1976 | Hadden et al. | 210/258 |
| 4,224,157 | 9/1980 | Jain | 210/519 |
| 4,664,795 | 5/1987 | Stegall et al. | 210/202 |
| 4,971,690 | 11/1990 | Justice | 210/532.2 |
| 4,986,905 | 1/1991 | White | 210/104 |
| 5,200,065 | 4/1993 | Sinclair et al. | 210/258 |
| 5,269,911 | 12/1993 | Stegall et al. | 210/257.1 |
| 5,360,556 | 11/1994 | Ball et al. | 210/258 |
| 5,441,631 | 8/1995 | Stegall et al. | 210/258 |

*Primary Examiner*—Joseph W. Drodge
*Attorney, Agent, or Firm*—John M. Harrison

[57] ABSTRACT

A sewage effluent disposal system for receiving sewage from a home or business location, treating the sewage in a primary treatment plant and facilitating the flow of treated effluent by gravity from the treatment plant into a holding tank having a secondary treatment system. The finally-treated effluent is pumped from the holding tank by means of a float-controlled pump apparatus, wherein the float is set to allow the submersible pump to operate when the effluent in the holding tank has reached a preselected high level and the pump motor is cut off when the effluent level is lowered to a preselected low level. A timer is provided in the effluent pump circuit to facilitate pumping at selected time intervals from the holding tank through a dual filter unit and from the dual filter unit into a drip field manifold and drip lines buried in the ground. The effluent flow is returned through a return manifold to the filter system when it is desired to flush the drip lines. The filter unit typically includes a pair of spin filters, each having a 150 mesh screen and the filters are constantly backwashed with effluent. When the effluent leaves the filters, it flows through a check valve into the drip field manifold and the drip lines, where it is normally forced through emitters spaced in the drip lines.

17 Claims, 2 Drawing Sheets

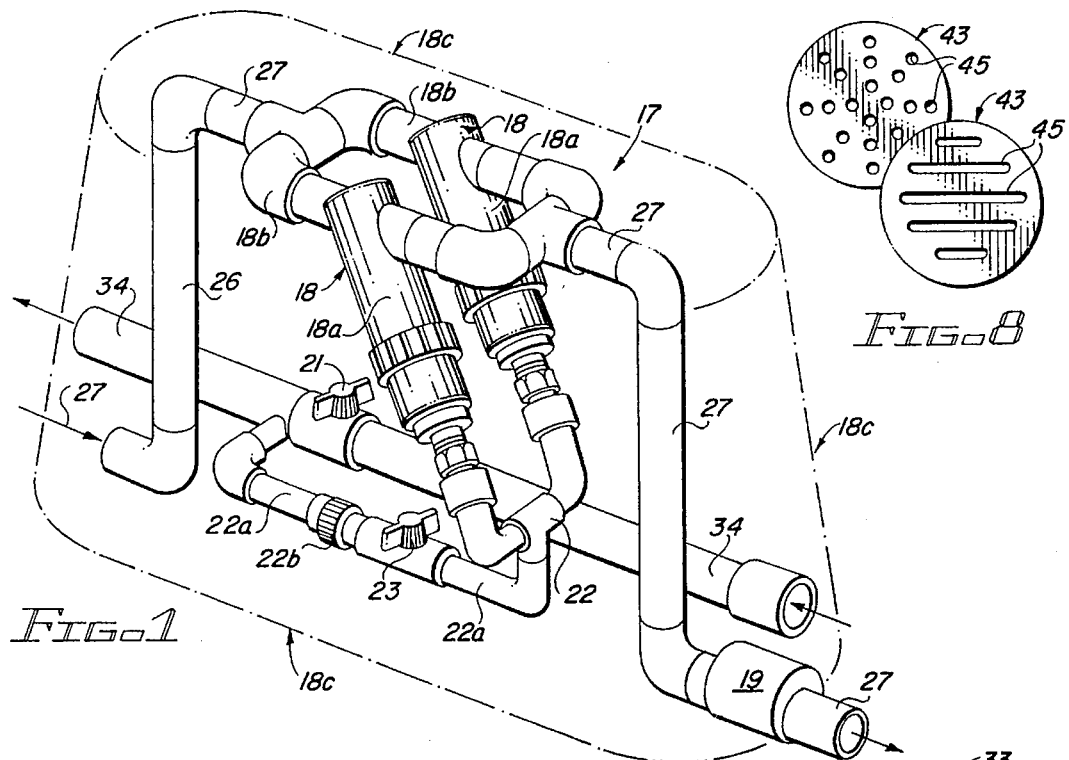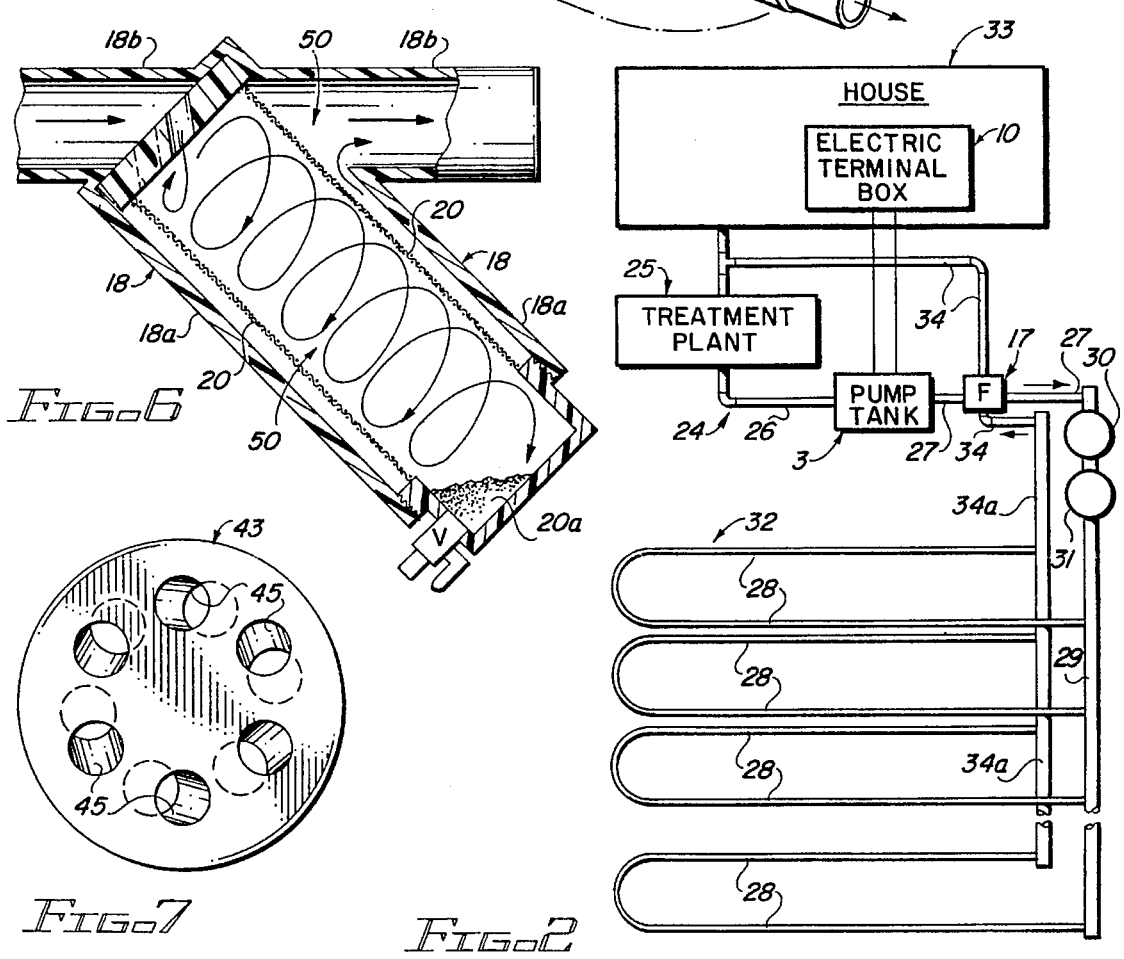

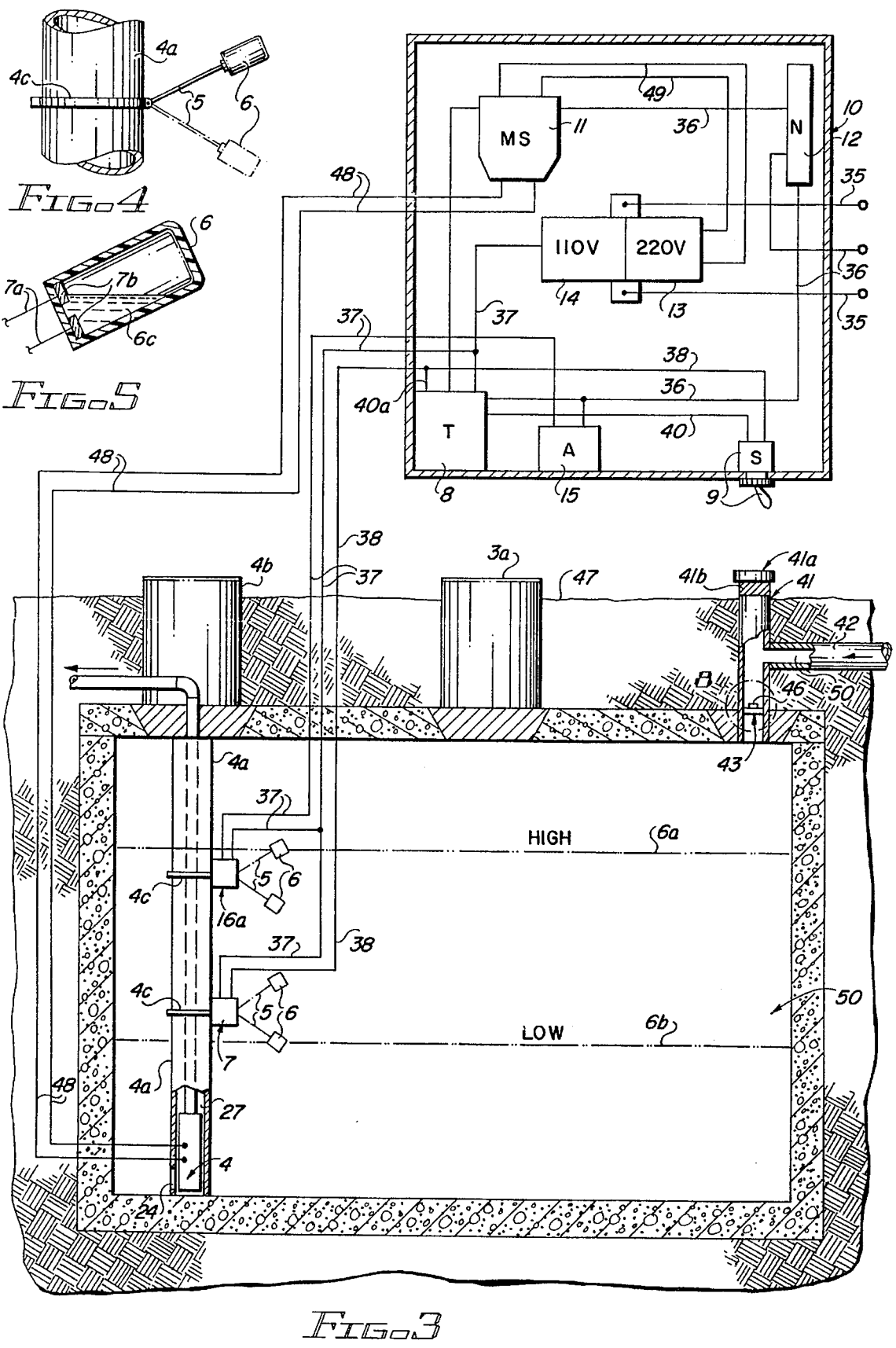

SEWAGE EFFLUENT DISPOSAL SYSTEM HAVING SPARGER IN HOLDING TANK

BACKGROUND OF THE INVENTION

Field of the Invention

This invention relates to sewage treatment systems, and more particularly, to a sub-surface sewage effluent disposal system which is especially designed for homes and small businesses. The system includes a primary treatment plant or tank, typically having a minimum holding capacity of 300 gallons. The primary treatment plant is designed to receive raw sewage from the home or business, treat the sewage and facilitate gravity flow of effluent from the primary treatment plant to a holding tank having an additional treatment apparatus, the effluent discharge from the holding tank being controlled by a timer and a float-operated submersible pump. The pump is connected to an electric control box located in the home or business and is controlled by the float and timer apparatus, such that the float allows the pump motor to come on when the effluent in the holding tank has reached a preselected high level, typically about 21 inches, and the pump motor cuts off when the effluent level is lowered to a preselected low level, typically about 14 inches. The total volume of treated effluent pumped from the holding tank is normally determined by the timer and not "on-demand" by the float, thus allowing controlled pumping periods determined by setting the timer at the electric control box located in the home or business. Alternatively, the timer can be bypassed to facilitate "on demand" pumping solely by operation of the float. The holding tank is also fitted with a high-water warning system which includes a warning float that is set such that there will typically be a minimum of 500 gallons of reserve capacity in the holding tank when the alarm is activated at a preselected level, usually about 30 inches of effluent, in the holding tank. When the warning float is activated, an 80 decibel audible alarm sounds in the control box located in the home or office to facilitate immediate attention due to the high effluent condition in the holding tank. The reserve capacity in the holding tank allows servicing of the pump and pump control system before overflow conditions are reached. The effluent may be further treated in the holding tank through a treatment riser located on top of the holding tank and enclosing a grate or sparger having slots or holes, upon which chlorine or other treatment tablets can be placed, to selectively treat the effluent flowing into the holding tank from the primary treatment tank. The slots or holes in the grate or sparger also serve to minimize splash and turbulence in the holding tank as the effluent enters. The effluent is pumped from the holding tank pursuant to the float and timer as described above, through a filter unit which includes a pair of filters mounted in parallel. The filters are typically ¾ inch or 1 inch spin filters having a 150 mesh screen and are designed to constantly backwash, typically at a rate of 2 gallons per minute. The effluent leaves the filters through a check valve and enters a discharge header or manifold, where it flows through drip lines of sufficient length to dispose of a predetermined quantity of effluent, buried in the ground. The drip lines, which in concert are called a "drip field", are constructed using suitable pressure-induced, water-emitting drip hose having drip emitters typically spaced every two feet and the drip lines themselves are spaced a minimum of two feet apart and are about 2000 feet in total length from the discharge manifold to the return manifold. A vacuum breaker is commonly installed at the highest point in the drip field in conventional fashion and where the drip field fall is equal to or greater than about 4:1, pressure regulators are usually installed in the drip lines to effect a more uniform flow of effluent through the drip field. When flushing of the drip field is required, a field flush valve in the filter unit is opened and effluent flows continuously through the drip field under reduced pressure by means of the return manifold and passes through the filter unit flush return line to the primary tank treatment inlet.

It will be appreciated by those skilled in the art that a primary feature of this invention is provided wherein the two spin filters are constantly backwashed and the contaminants in the filter screens are thus washed down the filter walls and out of the bottom of the filter, through the filter backwash line and valve. The filter backwash valve is typically installed in the backwash line by means of a piece of one-half inch flexible PVC and a union and may be adjusted to control the volume of backwash effluent returned to the primary treatment tank.

One of the problems inherent in the operation of sewage treatment systems is that of producing an effluent of sufficient quality which is suitable for distribution in the ground for disposal. One way of accomplishing this result is to filter the effluent that comes from the treatment plant before it is disposed of, either in the ground or otherwise. However, many conventional filter systems are subject to plugging and high maintenance requirements make the filters extremely expensive to use.

Accordingly, it is an object of this invention to provide a simple and reliable sewage effluent disposal system which includes a specially-designed pump and casing for pumping effluent from a holding tank by operation of a unique timer and float apparatus, through a specially designed, constantly backwashed filter unit, to facilitate disposal of effluent which is well within acceptable state specifications for waste water disposal.

Another object of this invention is to provide a new and improved holding tank, submersible pump, float and timing apparatus and an effluent filter system which is used in combination with a primary sub-surface sewage treatment plant, tank or system, for treating effluent from the primary treatment tank or plant, pumping the effluent so treated through the constantly backwashed filter system according to a preselected time sequence and disposing of effluent having suitable specifications for meeting waste water disposal guidelines set up by a governing authority.

Still another object of this invention is to provide a primary treatment plant, a holding tank effluent treatment system and a float-operated submersible pump, timing and filter apparatus for a waste water disposal system, which primary treatment plant, holding tank effluent treatment system, float-operated pump, timing and filter apparatus elements are operated by an electric circuit to facilitate controlling the effluent level in the holding tank that receives effluent from the treatment plant, effecting further effluent treatment in the holding tank and allowing controlled pumping of the treated effluent through a specially designed dual spin filter unit by operation of the timer. The filter unit typically contains a pair of spin-type, automatically backwashed filters for filtering the effluent and distributing the effluent through a check valve to a conventional drip field, where the effluent is allowed to seep into the underlying soil.

SUMMARY OF THE INVENTION

These and other objects of the invention are provided in a new and improved, simple and reliable sewage effluent disposal system characterized by a primary treatment plant or tank, a holding tank incorporating an effluent treatment apparatus, a float-controlled submersible pump and timer device, a mercury switch float high effluent alarm system and a dual filter, along with a sub-surface waste water drip field disposal system, which submersible pump and timer are operated by a mercury switch float in the holding tank that receives effluent through the effluent treatment apparatus from the primary treatment plant or tank. The timer facilitates controlled pumping of the effluent from the holding tank to a specially designed, dual spin-type, constantly backwashed filter unit, such that the filtered effluent is pumped to the sub-surface drip field, containing the desired footage of drip pipe or hose, equipped with drip emitters, and a valve-operated optional return of effluent from the drip field facilitates optional flushing of the drip field to maintain the filters and drip field on-line during the pumping sequences normally controlled by the timer.

BRIEF DESCRIPTION OF THE DRAWING

The invention will be better understood by reference to the accompanying drawings, wherein:

FIG. 1 is a perspective view of a preferred set of filters used to filter the effluent in the sewage effluent disposal system of this invention;

FIG. 2 is a schematic layout of a typical sewage effluent disposal system of the invention;

FIG. 3 is a sectional view of a control box, holding tank, effluent treatment riser, float alarm and float and submersible pump system of the sewage effluent disposal system;

FIG. 4 is a side view of a typical mercury switch float system for controlling operation of the submersible pump illustrated in FIG. 3;

FIG. 5 is a sectional view of the float illustrated in FIG. 4;

FIG. 6 is a sectional view of one of the filters illustrated in FIG. 1;

FIG. 7 is a top view of a typical grate used in the treatment riser of the holding tank illustrated in FIG. 3; and FIG. 8 is a top view of alternative grates for use in the treatment riser.

DESCRIPTION OF THE PREFERRED EMBODIMENTS

Referring initially to FIG. 2 of the drawings, the sewage effluent disposal system of this invention is generally illustrated by reference numeral 1 and includes a primary treatment tank or plant 25, which is commonly located below the surface of the ground and is designed to treat raw sewage flowing into the primary treatment plant 25 through a primary sewer line 2, from the structure 33. A treatment tank discharge line 26 extends from the clarifier section of the primary treatment plant 25 and flows by gravity to a holding tank 3, which is also typically located below ground level at a lower grade than the primary treatment plant 25. As illustrated in FIGS. 1 and 3, effluent from the primary treatment plant 25 is directed into the treatment riser inlet 42 of a treatment riser 41 provided on the top of the holding tank 3 and is caused to flow through a treatment riser inlet grate or sparger 43, provided in the treatment riser inlet 41. The treatment riser 41 is closed by a removable riser cap 41a, having a cap screen 41b, and the riser grate 43 includes grate slots 44 or grate openings 45, as illustrated in FIGS. 7 and 8 and is designed to serve two purposes: first of all, chlorine tablets 46 can be placed on the treatment riser grate 43 by removal of the riser cap 41a to facilitate further treatment of the effluent entering the treatment riser 41 from the primary treatment plant 25 as illustrated in FIG. 3. Secondly, the grate slots 44 or the grate openings 45 in the treatment riser grate 43 serve to divide the flow of effluent flowing into the treatment riser 41 and reduce turbulence in the effluent 50 in the holding tank 3. An inspection hatch 3a is also preferably provided in the holding tank 3 to facilitate clean-out and inspection of the interior of the holding tank 3.

Referring again to FIGS. 1, 3, 4 and 5 of the drawings, a submersible pump 4 is located in a pump casing 4a vertically disposed in the holding tank 3 and terminating at a pump riser 4b, for pumping effluent 50 from the holding tank 3 through a holding tank discharge line 27, into a filter apparatus 17. In a preferred embodiment of the invention the float arm 5 of a mercury float switch 7 is pivotally tethered to the pump casing 4a by means of a mount band 4c and a mercury switch float 6, having an internal pool of mercury 6c and switch contacts 7b, connected to switch wiring 7a, as illustrated in FIG. 5, is attached to the extending end of the float arm 5 to facilitate pivotally raising and lowering the float 6 with the effluent level of the holding tank 3, as further illustrated in FIG. 4. The float 6 is electrically connected by means of system power wiring 37 and timer power wiring 38 to an electric control box 10 located in the structure 33, as further illustrated in FIGS. 1 and 5, for purposes which will be hereinafter further described. A timer 8 is also located in the electric control box 10 and is wired to the pump 4 and the float 6 by means of pump wiring 48, to facilitate operating the submersible pump 4 for a controlled period of time determined by the timer 8 pursuant to operation of the float 6 on the float arm 5, as further hereinafter described. Accordingly, the float 6 is capable of operating through a range of motion on the float arm 5, which operating range includes a high effluent position 6a and a low effluent position 6b, as illustrated in FIG. 3. A timer bypass switch 9 is provided in the electric control box 10 and is wired to the timer 8 by means of bypass power wiring 40, to optionally allow the submersible pump 4 to operate on demand responsive to rising and falling of the float 6 on the float arm 5 to the high effluent position 6a and the low effluent position 6b in the holding tank 3, without operation of the timer 8. In a preferred embodiment of the invention, a mercury-operated alarm float 16 is similarly attached to the pump casing 4a by means of float arm 5. The alarm float 16 is positioned above the float 6 on the pump casing 4a by means of a mount band 4c and is electrically connected to the electrical control box 10 by system power wiring 37. This facilitates operation of an audible alarm 15 which is located in the electric control box 10 and will sound under circumstances where the pump 4 fails to operate and the effluent 50 in the holding tank 3 reaches a predetermined level. In a most preferred embodiment of the invention the alarm float 16 is positioned on the vertical pump casing 4a at a selected height in the holding tank 3 such that sufficient time is allowed for servicing the holding tank 3 and the submersible pump 4 before overflow conditions occur in the holding tank 3.

Referring now to FIGS. 1 and 6 of the drawings, the filter apparatus 17 typically includes a pair of filters 18, mounted in parallel in filter mount lines 18b and the filter apparatus 17 may be enclosed by a removable filter cover 18c, illustrated in phantom. Effluent 50 is periodically pumped from the holding tank 3 by the submersible pump 4 pursuant to operation of the timer 8, through the holding tank discharge line 27 and filter mount lines 18b, to the filters 18, where the effluent is filtered by the spinning technique detailed in FIG. 6. The effluent is subsequently pumped through the check valve 19 and the extension of the holding tank discharge line 27 and the discharge manifold 29, illustrated in FIG. 2, to the drip lines 28 in the drip field 32. Under ordinary circumstances, where the field flush valve 21 is closed, the effluent is depleted through multiple conventional emitters (not illustrated) in the drip lines 28, where it seeps through the underlying soil. Under these circumstances, there is no return of effluent to the filter apparatus 17. However, when it is desired to flush the drip lines 28 in the drip field 32, the field flush valve 21 is opened to facilitate a reduced pressure in the drip lines 28 of the drip field 32, which allows return flow of effluent through the drip field 32 and back to the filter apparatus 17, through the return manifold 34a and filter flush return line 34, as illustrated in FIG. 1. This effluent is then returned by means of the filter flush return line 34 to the primary line 2, which enters the primary treatment tank 25. As further illustrated in FIG. 2, a pressure regulator 31 may be provided in the discharge manifold 29 to enhance the return stream of effluent to the primary treatment tank 25 when the field flush valve 21 is open. Furthermore, depending upon the fall of the terrain in which the drip lines 28 are buried, one or more vacuum breakers 30 may be installed in the drip lines 28 to enhance the effluent flow through the drip field 32.

Referring again to FIG. 1 of the drawings, the filters 18 may be backwashed constantly in the filter apparatus 17 by incrementally opening a backwash valve 23, located in the backwash line 22a of the filter apparatus 17, so that a controlled portion of the effluent flowing through the filters 18 may flow through the backwash tee 22 and backwash line 22a, to the primary treatment tank 25, through the filter flush return line 34 and primary sewer line 2. This continuously flushes the screens 20 free of particles 20a in the filters 18 and washes the accumulated particles 20a through the backwash tee 22, backwash line 22a, filter flush return line 34 and the primary sewer line 2, into the primary treatment tank 25.

Referring again to FIGS. 2 and 3 of the drawings, the electric control box 10 includes a neutral block 12 and magnetic switch terminal 11, which receive the neutral power wiring 36 in the power supply wiring 35. A 220-volt, 15 amp breaker 13 and a 110-volt, 15 amp breaker 14 are also provided in the electric control box 10 for receiving the power supply wiring 35, as further illustrated in FIG. 3. The 220-volt, 15 amp breaker 13 is connected to the magnetic switch terminal 11 by means of magnetic switch power wiring 49. Power is fed from the 110-volt, 15 amp breaker 14 to the audible alarm switch 16a, float switch 7 and timer 8 by means of system power wiring 37. The neutral power wiring 36 extends from the neutral block 12 to the timer 8 and the audible alarm 15 and the pump wiring 48 extends from the magnetic switch terminal 11 to the motor (not illustrated) of the submersible pump 4, for operating the submersible pump 4. Timer power wiring 38 also connects the float switch 7 to the timer bypass switch 9, for purposes which will be hereinafter described. The timer bypass switch 9 is also wired into the timer 8 by means of bypass power wiring 40 and into the float 6 by means of shunt power wiring 40a, to allow bypassing of the timer 8 and facilitate "on demand" operation of the pump 4 by pivoting of the float arm 5 and the rising and falling of the float 6 of the float switch 7 to the high water position 6a and the low water position 6b, as further illustrated in FIG. 3.

In operation, and referring again to the drawings, the sewage effluent disposal system of this invention operates as follows. Raw sewage intermittently flows from the structure 33 through the primary sewer line 2, into the primary treatment plant 25 by gravity and is treated in conventional fashion, where the effluent is clarified and overflows through a primary treatment tank discharge line 26, into the treatment riser 41 of the holding tank 3. The effluent may be treated as it enters the treatment riser 41 by means of chlorine tablets 46, placed on the treatment riser grate 43 by removing the screened riser cap 41a, as the effluent flows through the grate slots 44 or grate openings 45 in the grate 43, into the holding tank 3, where it is held momentarily. As the level of effluent 50 rises in the holding tank 3, the float 6 attached to the float arm 5 of the float switch 7, which float arm 5 is pivotally attached to the pump casing 4a, rises from the low water position 6b to the high water position 6a illustrated in FIG. 3. When the float 6 reaches the high water position 6a, the submersible pump 4 is energized by the mercury 6c flowing in the float 6 according to a timing sequence which is preset in the timer 8 and the submersible pump 4 pumps effluent 50 from the holding tank 3 through the effluent inlet 24 in the pump casing 4a and into holding tank discharge line 27 and the filter apparatus 17, and then into the discharge manifold 29 and the drip lines 28 of the drip field 32. When the time sequence has expired according to operation of the timer 8, the submersible pump 4 terminates operation, regardless of the level of effluent 50 in the holding tank 3 and the position of the float 6 and float arm 5 of the float switch 7. This procedure is repeated as effluent continues to flow into the holding tank 3 from the primary treatment plant 25.

As illustrated in FIG. 1, when the field flush valve 21 in the filter apparatus 17 is closed, the submersible pump 4 pumps the effluent from the filters 18 and through the discharge manifold 29, into the drip field 32, where it is forced through multiple emitters (not illustrated) in the respective drip lines 28. However, under circumstances where it is desired to flush the drip lines 28, the field flush valve 21 is opened and effluent flows through the entire drip field 32 and through the return manifold 34a, filter flush return line 34 and field flush valve 21, to the primary treatment tank 25.

Referring again to FIGS. 1 and 2 of the drawings, the filters 18 are constantly backwashed by a flow of effluent, typically about two gpm, through the lower end of the filters 18 and into the backwash tee 22 and the backwash line 22a, where the flush effluent and particles 20a flow into the filter flush return line 34 and through the primary sewer line 2, into the primary treatment tank 25.

In a preferred embodiment of the invention, the holding tank 3 may be sufficiently large to contain from about 300 to 2000 gallons of effluent, and most preferably, from about 500 to 1500 gallons. Furthermore, the drip line 28 element of the sewage effluent disposal system may be characterized by conventional drip line having conventional emitters for discharging the filtered and treated effluent into the surrounding soil. Moreover, the submersible pump 4 in the unique pumping and pump control element of the systems may be typically characterized as a three-quarter horsepower, 25 gpm submersible pump of the deep water well type and the pump casing 4a may typically be four-inch, schedule 40 PVC pipe. The effluent inlet 24 in the pump casing 4a is preferably positioned away from the treatment riser inlet 42, to minimize turbidity of the effluent 50 in the holding tank 27 at the effluent inlet 24, as illustrated in FIG. 3.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A sewage effluent disposal system comprising a primary sewage treatment tank for receiving sewage, treating the sewage and discharging the effluent; an effluent holding tank provided in fluid communication with said primary sewage treatment tank for further treating the effluent a treatment riser provided on said effluent holding tank for receiving the effluent from said primary sewage treatment tank, said treatment riser communicating with the interior of said effluent holding tank; and sparger means provided in said treatment riser for scattering the effluent into multiple streams for entry into said effluent holding tank; pump means provided in said effluent holding tank for pumping effluent from said effluent holding tank; filter means provided in fluid communication with said pump means for filtering the effluent pumped from said effluent holding tank; and a drip field provided in fluid communication with said filter means for receiving and discharging the effluent.

2. The sewage effluent disposal system of claim 1 comprising disinfectant provided in said treatment riser on said sparger means for disinfecting the effluent passing through said treatment riser and said sparger means.

3. The sewage effluent disposal system of claim 1 wherein said pump means comprises a substantially vertically-oriented pump casing provided in said effluent holding tank; a submersible pump provided in said pump casing; float switch means pivotally-mounted on said pump casing and provided in fluid communication with the effluent in said effluent holding tank, said float switch means further electrically connected to said submersible pump, whereby said submersible pump is periodically energized and deenergized responsive to pivotal movement of said float switch means as the level of the effluent in said effluent holding tank falls and rises, respectively.

4. The sewage effluent disposal system of claim 3 comprising timer means electrically connected to said float switch means and timer by-pass switch means electrically connected to said timer means and said float switch means, whereby said submersible pump may be selectively operated by said float switch means and said timer means or solely by said float switch means, responsive to manipulation of said timer by-pass switch means.

5. The sewage effluent disposal system of claim 3 comprising alarm switch means pivotally mounted on said pump casing above said float switch means and provided in fluid communication with the effluent on said effluent holding tank when the effluent rises to a predetermined alarm level, and alarm means electrically connected to said alarm switch means, whereby said alarm means is activated responsive to rising of the effluent in said effluent holding tank to said predetermined alarm level and pivotal movement of said alarm switch means with said rising of the effluent.

6. The sewage effluent disposal system of claim 5 comprising disinfectant provided in said treatment riser on said sparger means for disinfecting the effluent passing through said treatment riser and said sparger means.

7. The sewage effluent disposal system of claim 3 comprising disinfectant provided in said treatment riser on said sparger means for disinfecting the effluent passing through said treatment riser and said sparger means.

8. The sewage effluent disposal system of claim 7 comprising timer means electrically connected to said float switch means and timer by-pass switch means electrically connected to said timer means and said float switch means, whereby said submersible pump may be selectively operated by said float switch means and said timer means or solely by said float switch means, responsive to manipulation of said timer by-pass switch means.

9. The sewage effluent disposal system of claim 8 comprising alarm switch means pivotally mounted on said pump casing above said float switch means and provided in fluid communication with the effluent on said effluent holding tank when the effluent rises to a predetermined alarm level and alarm means electrically connected to said alarm switch means, whereby said alarm means is activated responsive to rising of the effluent in said effluent holding tank to said predetermined alarm level and pivotal movement of said alarm switch means with said rising of the effluent.

10. The sewage effluent disposal system of claim 9 comprising electrical control box means electrically connected to a power source and said submersible pump, said float switch means, said timer means, said timer by-pass switch means and said alarm switch means, for operating said submersible pump, said float switch means, said timer means, said timer by-pass switch means and said alarm switch means.

11. The sewage effluent disposal system of claim 1 comprising electrical control box means electrically connected to a power source and said pump means, for operating said pump means.

12. The sewage effluent disposal system of claim 1 wherein said filter means comprises at least two of spin-type filters mounted in parallel fluid communication with said pump means, backwash means provided in fluid communication with said filters for backwashing said filters, a return line connected to said drip field and said primary sewage treatment tank for optionally returning effluent from said drip field to said primary sewage treatment tank and field flush valve means provided in said return line, whereby the effluent may be selectively flushed through said drip field and returned to said primary sewage treatment tank responsive to opening of said field flush valve means.

13. The sewage effluent disposal system of claim 12 wherein said pump means comprises a substantially vertically-oriented pump casing provided in said effluent holding tank; a submersible pump provided in said pump casing; float switch means pivotally-mounted on said pump casing and provided in fluid communication with the effluent in said effluent holding tank, said float switch means further electrically connected to said submersible pump, whereby said submersible pump is periodically energized and deenergized responsive to pivotal movement of said float switch means as the level of the effluent in said effluent holding tank falls and rises, respectively.

14. The sewage effluent disposal system of claim 13 comprising timer means electrically connected to said float switch means and timer by-pass switch means electrically connected to said timer means and said float switch means, whereby said submersible pump may be selectively operated by said float switch means and said timer means or solely by said float switch means, responsive to manipulation of said timer by-pass switch means.

15. The sewage effluent disposal system of claim 14 comprising alarm switch means pivotally mounted on said pump casing above said float switch means and provided in fluid communication with the effluent on said effluent holding tank when the effluent rises to a predetermined alarm level and alarm means electrically connected to said alarm switch means, whereby said alarm means is activated responsive to rising of the effluent in said effluent holding tank to said predetermined alarm level and pivotal movement of said alarm switch means with said rising of the effluent.

16. The sewage effluent disposal system of claim 15 comprising electrical control box means electrically connected to a power source and said submersible pump, said float switch means, said timer means, said timer by-pass switch means and said alarm switch means for operating said submersible pump, said float switch means, said timer means, said timer by-pass switch means and said alarm switch means.

17. The sewage effluent disposal system of claim 16 comprising disinfectant provided in said treatment riser on said sparger means for disinfecting the effluent passing through said treatment riser and said sparger means.

* * * * *